Oct. 10, 1939.   W. B. HARRISON   2,175,754
BAIT CONTAINER FOR ANIMAL TRAPS
Filed June 8, 1937
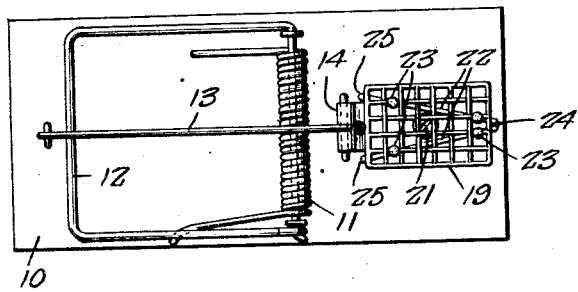
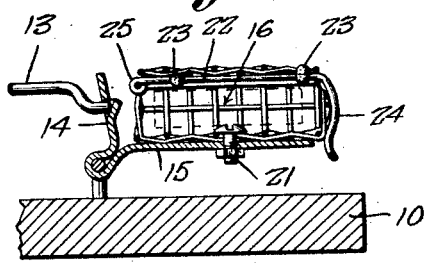
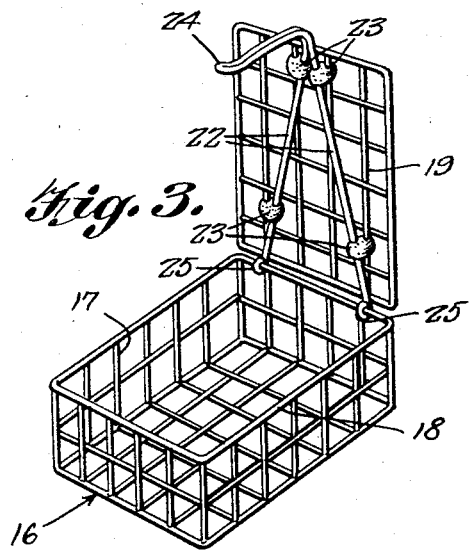
Wallace B. Harrison,
INVENTOR Patented Oct. 10, 1939

2,175,754

UNITED STATES PATENT OFFICE 2,175,754

BAIT CONTAINER FOR ANIMAL TRAPS

Wallace B. Harrison, Pasadena, Calif.

Application June 8, 1937, Serial No. 147,069

1 Claim. (Cl. 43—58)

This invention relates to bait containers for animal traps and has for an object to provide a bait container which is secured to the treadle plate of the trap so that after an animal has tripped the trap and has been caught, another animal cannot take the bait from the trap.

A further object is to provide a trap with a bait container of foraminous type to permit the odor of the bait to escape while at the same time preventing an animal from taking bait from the trap so that an animal will make a desperate effort to get the bait and thereby trip the trap and be caught.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawing forming part of this specification,

Figure 1 is a plan view of a trap provided with a bait container constructed in accordance with the invention.

Figure 2 is a longitudinal sectional view of the bait container secured to the treadle plate of a trap.

Figure 3 is a perspective view of the bait container with the lid open and showing the reinforcing member for the lid forming both a hinge and a fastening hook for the lid.

Referring now to the drawing in which like characters of reference designate similar parts in the various views, a conventional rodent trap is shown comprising a base 10, a helical spring 11 holding a transverse tripping bar 12 in cocked position. A trigger bar 13 is pivoted at one end on the bar and the free end is adapted to hook underneath the offset rear end 14 of the pivoted treadle plate 15 and hold the latter against undesired release when the spring is under tension. These parts are conventional.

In carrying out the invention, a foraminous bait container 16 is provided for supporting the bait upon the treadle plate, the container including a wire basket 17 having a frame bar 18 at the top upon which a wire lid 19 is supported when the container is holding a bait. The basket portion of the container is firmly secured to the treadle plate 15 by a bolt 21 or other connector so that the container is rigidly secured to the treadle plate and an animal must make a desperate effort to get the bait and thereby trip the trap and be caught. Also the foraminous construction of the bait container permits the odor of the bait to escape while retaining the bait against destruction by another animal after one animal has been caught.

The lid 19 is stiffened by a V-shaped member 22 which is soldered to the lid as shown at 23 and extends from the front to the rear end of the lid. The solder chunks 23 form weight. The front end of the V-shaped member is turned downwardly to provide a catch 24 which engages the front end of the basket member of the container to secure the lid in place. The rear ends of the V-shaped member are formed to provide hinge eyes 25 which embrace the top bar 18 of the basket to pivotally connect the lid to the basket.

It will be understood that while a trap of a size and form adapted to catch mice and rats is shown, a trap working on the principle may be made of any desired size to adapt it to trap various animals.

From the above description it is thought that the construction and operation of the invention will be fully understood without further explanation.

What is claimed is:

The combination with a trap having a treadle plate, of a detachable bait container comprising a foraminous basket, means detachably securing the basket to the treadle plate, a lid for the basket, and a V-shaped reinforcing member formed of spring wire fixed to the underside of the lid, the ends of the legs of the V-shaped member being pivotally engaged with the basket, the end of the member opposite the pivots being directed downwardly to provide a resilient hook adapted to engage the bottom of a wall of the basket, the legs of the member being soldered at spaced points to the lid, the chunks of solder coacting with the hook to hold the lid closed.

WALLACE B. HARRISON.